United States Patent [19]

Musacchia, Sr.

[11] Patent Number: 5,094,464
[45] Date of Patent: Mar. 10, 1992

[54] BOWFISHING ARROW WITH RELEASABLE END ASSEMBLY

[76] Inventor: John Musacchia, Sr., 3705 S.W. 42nd Pl., Gainesville, Fla. 32608

[21] Appl. No.: 652,623

[22] Filed: Feb. 8, 1991

[51] Int. Cl.$^5$ .................................................. F42B 6/08
[52] U.S. Cl. ........................................ 273/419; 43/6; 403/349
[58] Field of Search .................... 273/416, 419–423; 43/6; 403/349

[56] References Cited

U.S. PATENT DOCUMENTS

| | | | |
|---|---|---|---|
| 213,976 | 4/1879 | Coloney | 43/6 X |
| 1,133,189 | 3/1915 | Shannon | 43/6 X |
| 1,194,793 | 8/1916 | Styers | 403/349 X |
| 1,696,462 | 12/1928 | Victor | 403/349 X |
| 2,212,345 | 8/1940 | Kreiger | 273/421 X |
| 3,423,781 | 1/1969 | Henson | 403/349 X |
| 3,945,642 | 3/1976 | Henthorn, Jr. | 273/420 |
| 4,518,162 | 5/1985 | Oates | 403/349 X |
| 4,645,211 | 2/1987 | Beiter | 273/416 |

FOREIGN PATENT DOCUMENTS 676374  11/1929  France .................... 403/349

Primary Examiner—Paul E. Shapiro
Attorney, Agent, or Firm—Richard C. Litman

[57] ABSTRACT

A bowfishing arrow includes a nock assembly that is readily manipulated to allow for the quick removal and re-attachment to the rear end of the same or another arrow shaft. The nock assembly is provided with a forwardmost elongated plug insertable within a socket or bore within the rear of the arrow shaft while guidance and locking together of the components is achieved through a radial pin on the nock assembly plug engageable within a multi-directional slot arrangement. Short of achieving a fully assembled condition, a compressible member is engaged and thereafter produces a constant biasing force that in addition to assuring a rigid, rattle-free attachment, also maintains the components in a locked position. Removal of the nock assembly requires a positive forward displacement of the nock assembly relative the arrow shaft against the force of the compressible member prior to a compound angular and axial movement between the components.

10 Claims, 1 Drawing Sheet

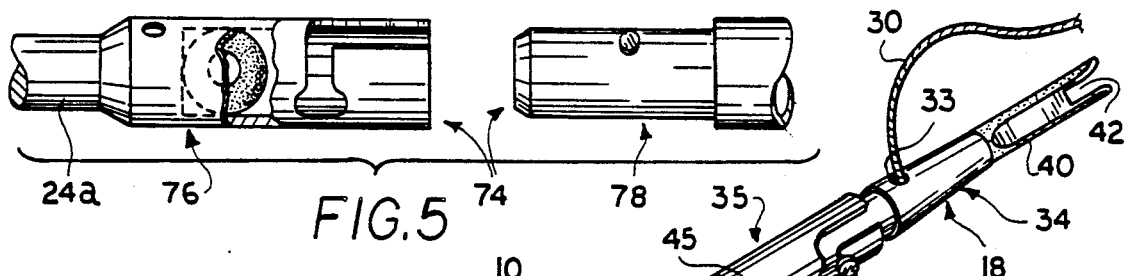
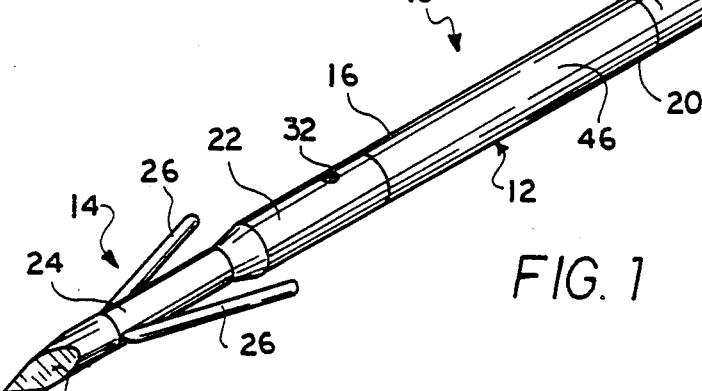
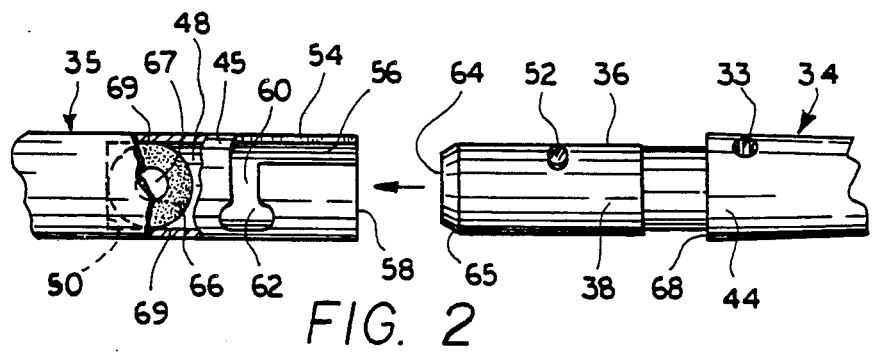
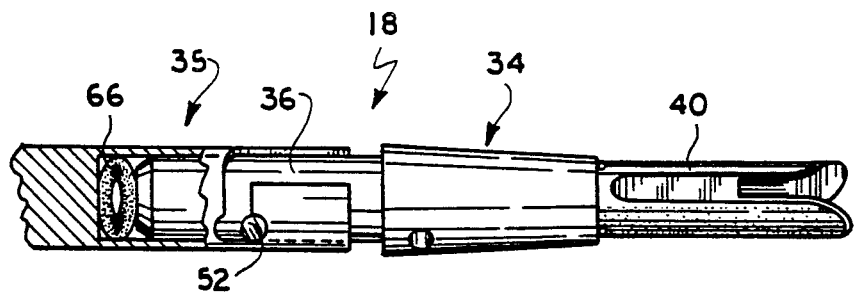
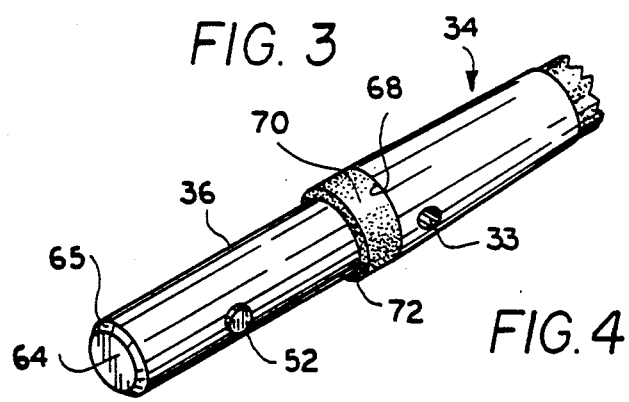

BOWFISHING ARROW WITH RELEASABLE END ASSEMBLY

FIELD OF THE INVENTION

This invention relates generally, to bowfishing and more particularly, to an improved arrow as used in bowfishing and wherein the nock and/or the head is part of an arrow section that is quickly and easily removed and re-attached to the balance of the arrow.

BACKGROUND OF THE INVENTION

The sport of bowfishing has been very popular for many years and most recently the interest in this exciting sport has skyrocketed. In bowfishing, an archer is able to practice his skill in hunting at any time of the year and is not confined to the more restrictive open seasons for conventional land based game, since one may usually always find open fishing seasons in not too distant streams, lakes, bays or the open waters.

As is well known to those skilled in the art, fishing with an archery bow involves the use of specially adapted arrows having a barbed arrowhead and wherein the arrow is tethered by a line leading from the arrow to a reel co-located with the bowfisherman. This reel may be attached to the user's bow or mounted adjacent thereto such that, upon shooting the arrow, the line automatically follows the flight of the arrow and subsequently provides means allowing for the retrieval of the spent tethered arrow, hopefully with a speared fish thereupon.

The shortcoming of existing bowfishing arrows becomes apparent at this point. Upon retrieval of an arrow that has impaled a fish, it will be understood that the barbed arrowhead will be at least embedded within the flesh and bones of the prey and in many cases will have passed through the fish body to the far side. In either case, the extraction of the arrow from the fish is anything but a simple or safe task. In view of the barbed nature of the arrowhead, the arrow obviously can not just be pulled rearwardly to remove it from the fish. The common procedure involves either collapsing the arrowhead barbs to allow withdrawal of the arrow in a rearward direction through the fish or, unscrewing or otherwise separating a removable arrowhead from its shaft so that the arrow may be freely withdrawn. This operation exposes the bowfisherman to unnecessary danger, attempting to manipulate a sharp arrowhead, especially while standing in a pitching boat and dealing with a fish that may still be thrashing about.

In view of the above, it will be appreciated that any improvement in this art which would lead to a more convenient and safe manner of handling bowfishing arrows will be welcomed. This is particularly advantageous during bowfishing competitions wherein prizes are awarded to those landing the greatest fish weight during a timed period. Thus, improved bowfishing arrows permitting of not only safe but also rapid extraction, will be most appreciated and if immediate subsequent reuse of that portion of the arrow to which the tether line is affixed is possible, then the speed by which a competitor may shoot for another fish will be vastly enhanced.

DESCRIPTION OF THE RELATED ART

Numerous examples exist of arrows and/or arrowheads particularly adapted for bowfishing. U.S. Pat. Nos. 4,807,382, 4,819,360 and 4,901,467 issued to Albrecht, Thomas and Stolpe respectively, each illustrate typical arrowheads for bowfishing and wherein one or more barbs are pivotally carried by a sharpened tip member and in a manner allowing of an outward displacement of the barbs. The construction precludes retraction of the arrowhead unless the barbs are manipulated or, the sharpened tips are removed to permit the barbs to move forward. It is known to provide a distinctive nock section having means for attachment to the shaft of an arrow. U.S. Pat. No. 4,544,163 issued to Scanlon illustrates a separate arrow nock which is formed with a reduced diameter forward plug having longitudinal grooves. Attachment to the rear of a hollow arrow shaft is accomplished by applying an adhesive and inserting the nock plug into the hollow arrow shaft. No suggestion is seen in the known prior art of the unique combination as set forth herein.

SUMMARY OF THE INVENTION

By the present invention, an improved bowfishing arrow is provided and which includes a separate nock assembly having components cooperating with the rear of the arrow shaft to permit a quick and positive attachment/removal between the nock assembly and balance of the arrow. A compressible member within a bore in the rear of one part of the assembly acts upon the tip of a plug on the forward portion of the nock assembly, to present a constant biasing force against the nock plug as guide and catch elements respectively on the assembly permit an interlock or separation of the nock assembly from the arrow. In an alternative embodiment, the same guide and catch elements are proposed while the compressible member comprises a resilient ring element carried by the nock assembly plug such that the rear edge of the cooperating component of the assembly abuts and compresses this ring element to maintain the assembled arrow components in a positive, locked condition. Alternatively, or as an addition on any one bowfishing arrow, the head may be releasably attached by means of a similarly configured pair of cooperating components.

With a bowfishing line tethered to the instant nock assembly, it will be understood that after pulling in the line following the spearing of a fish, it is not necessary to manipulate the arrowhead before the arrow may be withdrawn from the fish. Instead, one merely applies a compound motion between the nock assembly and arrow shaft to easily and safely remove the nock assembly and its tethered line. Thereafter, if speed is of the essence, such as in bowfishing competition, the user simply reattaches the same nock assembly to another arrow shaft and is immediately ready to launch the tethered arrow against the next intended target. Alternatively, the same arrowhead and shaft may be subsequently used by pulling it forwardly through the fish and then is reattaching it to the same nock assembly.

Accordingly, one of the objects of the present invention is to provide an improved bowfishing arrow having a releasably attached nock assembly.

Another object of the present invention is to provide an improved bowfishing arrow having a socket at the rear of its shaft and which contains a compressible member serving to provide a biasing force against the removable plug of a nock assembly.

A further object of the present invention is to provide an improved bowfishing arrow including a separable nock assembly having a guide element adapted to cooperate with a slotted catch element mounted in the rear of the arrow shaft.

Still another object of the present invention is to provide an improved bowfishing arrow including a removable nock assembly releasably attachable to the rear of the arrow shaft by means of a guide pin on the nock assembly cooperating with a multi-channel catch element on the rear of the arrow shaft and wherein the retention of the connected components is assured by use of a compressible member contained within the component carried by the arrow shaft.

Another object of the present invention is to provide an improved bowfishing arrow including a nock assembly releasably connectable to the arrow shaft by an alternate pushing and twisting manipulation, i.e., a twist-lock, between the components and wherein a compressible resilient member carried either within the component on the shaft or upon the nock assembly assures a biasing action upon the connected components.

An additional object of the present invention is to provide an improved bowfishing arrow including a fish arrowhead releasably connectable to the arrow shaft by the interaction of push and twist elements carried by two separable components with one such component provided with resilient means presenting a biasing force maintaining an interlock between the attached components.

With these and other objects in view which will more readily appear as the nature of the invention is better understood, the invention consists in the novel combination and assembly of parts hereinafter more fully described, illustrated and claimed with reference being made to the attached drawings.

BRIEF DESCRIPTION OF THE DRAWINGS

FIG. 1 is a perspective view of a bowfishing arrow according to the present invention;

FIG. 2 is an enlarged, fragmentary, exploded view illustrating the cooperating elements providing the interlock between the nock assembly and arrow shaft;

FIG. 3 is a side elevation depicting the assembly of the components shown in FIG. 2;

FIG. 4 is a partial perspective view of the nock assembly and illustrates an alternative form of compressible resilient member; and FIG. 5 is a partial side elevation of the present invention as applied to the head of a bowfishing arrow.

Similar reference characters designate corresponding parts throughout the several figures of the drawings.

DESCRIPTION OF THE PREFERRED EMBODIMENT

Referring now to the drawings, particularly FIG. 1, the present invention will be understood to relate to a bowfishing arrow generally designated 10 and which includes a shaft 12 having an arrowhead assembly 14 affixed to its forward end 16 and a nock assembly 18 attached to its rear end 20. The composition of the shaft 12 itself and the specific barb construction of the arrowhead 14 are not critical to an understanding of the current invention since the important feature herein lies with the releasable attachment of distal arrow elements including either or both the nock assembly/arrowhead assembly to the respective end of a bowfishing arrow 10. In either case, cooperating plug and socket sections are employed as will be seen hereinafter. Thus, the shaft 12 may comprise either a solid or tubular member and may be constructed of any well known material including metal, plastics, composites, etc. In general, the fish-engaging portion of the arrowhead 14 may be of the individual bowfisherman's liking. Typically, such an arrowhead may include a rearmost mounting ferrule or section 22 suitable affixed to the shaft forward end 16 as by a friction fit, adhesive, etc. and from which projects a forward section 24 containing a plurality of normally rearwardly directed barbs 26. Frequently, these barbs are retained in the illustrated shooting position of FIG. 1 by means of a distal member such as the sharpened, pointed tip 28 which is threadedly attached to the forward section 24. This type of arrowhead is described in detail in my earlier U.S. Pat. No. 4,742,637 issued May 10, 1988. Details of employing the present concept of a releasable bowfishing arrowhead will be described hereinafter, with the immediate following description applying to the embodiment involving the releasable nock assembly 18.

It is known to tether the end of the bowfishing line 30 to the arrowhead as by means of a transverse bore 32 therein. However, to fully appreciate all of the benefits of using the releasable nock assembly of the present invention, it is proposed to tether this line 30 by means of a bore 33 within the nock assembly 18 as shown in FIG. 1.

The nock assembly 18 will be seen to comprise an elongated component including a main plug section or body 34 from which extends an elongated, forward tang or plug element 36 preferably having a cylindrical periphery 38. The distal, rearmost nock element 40 itself, includes the usual transverse slot 42 and although this element may be an integral part of a unitary nock assembly, it preferably comprises a plastics element suitably attached to the rear of the main body 34. The plug element 36 cooperates with an adaptor or socket section 35 likewise comprising an elongated cylindrical member and which is suitably affixed to the rear 20 of the shaft. From the standpoint of fluid dynamics and interference free operation, the diameter of the cylindrical periphery 44 of the front of the nock main body 34 is equal to the cylindrical periphery 45 of the adaptor 35 as well as the periphery 46 of the shaft.

The reduced diameter of the nock assembly forward plug element 36 is adapted to form a close sliding fit within the confines of the axially extending socket or bore 48 within the rear of the adaptor or socket tubular wall 54. The forward limit of the bore 48 will be defined by a stop or end wall 50 as shown in FIG. 2.

The secure joining of the removable plug or nock section 34 to the fixed adaptor or socket section 35 is accomplished through the interaction of a guide element on the plug element 36 and catch means on the cooperating socket section. The guide element comprises a pin 52 radially projecting from the intermediate area of the plug element periphery 38 and which has a length no greater than the thickness of the adaptor wall 54 surrounding the bore 48. The catch means will be seen to include a multi-channel arrangement comprising a longitudinal slot 56 through the adaptor wall 54 and which extends forwardly from the rear edge 58, joining with a transverse slot 60 which in turn joins with a rearwardly directed catch notch or slot 62.

To provide a resilient cushion when the nock plug element tip or end face 64 approaches the socket bore wall 50, and to present a constant rearward biasing action upon the coupled components, a compressible, resilient member 66 is positioned within the bore 48, juxtaposed its end wall 50. This member 66 may comprise any suitable composition but preferably consists of a short section of tubing manufactured of natural or synthetic elastomeric composition. Surgical tubing has been found to meet the requirements of this invention quite nicely, particularly in view of its ready availability and low cost. When a short section of this tubing 66 is placed as shown in FIG. 2 with its central axis 67 disposed transversely of the axial extent of the bore 48, the natural, at-rest state of the member insures that it remains in an expanded condition whereupon any deflection in a forward axial direction, will meet with the resistance offered by the material of the member 66. This resistance is enhanced due to the normal engagement of diametrically opposed portions 69-69 of the member's periphery with the walls of the bore 48 when at-rest, as in FIG. 2. In this manner, any force urging collapse of the walls of the member 66 can only produce a positive biasing action since the diameter of the member is precluded from expanding.

The joining of the nock assembly sections 34-35 to one another and thus unitary with the arrow shaft 12 comprises but a quick and simple maneuver. The user slips the tip 64 of the plug section 34 into the open ended bore 48 of the adaptor or socket section 35, assuring that the guide pin 52 is axially aligned with the adaptor slot 56 so that as the nock section 34 is moved forward, this pin 52 enters and travels to the forward limit of the slot 56. Prior to the pin reaching the transverse slot 60, the resistance of the compressible member 66 will be felt as the plug tip 64 engages the member 66. A decided biasing force is exhibited and remains as the pin is advanced to the transverse slot 60 and thereafter, the nock section 34 is twisted or angularly displaced relative the shaft and adaptor section 35 so as to advance the pin 52 to the end of the slot 60. At this point, forward pressure on the nock assembly is released and the biasing force of the member 66 will drive the plug and its pin rearwardly a short distance with the pin coming to rest in the rearwardly directed stop or catch notch 62. In this assembled condition, a noticeable biasing action yet remains to insure a positive and secure attachment of the components. The separation or release of the nock section from the arrow shaft and socket section is accomplished by a reversal of the foregoing steps. Thus, by pressing inwardly upon the nock section against the biasing force of the compressible member 66, the pin 52 is moved to the transverse slot 60 and permits one to angularly twist the nock section until the pin is moved to the longitudinal slot 56, whereupon a straight rearward pulling upon the nock section results in its total separation from the shaft and adaptor section.

The close sliding fit between the plug element 36 and bore 48 and the similar close fit between the pin 53 and the plurality of channels or slots 56,60,62 insures that a rattle-free arrow assembly is achieved while the biasing force as created by the compressed member 66 not only precludes accidental separation of the components but also allows of a quick and positive separation and reattachment thereof. The initial assembly of the nock section to the adaptor section is facilitated by the provision of a chamber 65 intermediate the plug end face 64 and its periphery 38.

In the alternative embodiment as shown in FIG. 4 of the drawings, the compressible means of the invention comprises a ring 70 of similar elastomeric composition, surrounding the nock plug element 36 and abutting the shoulder 68 of the main body of the nock section 34. The interaction during mounting and removal of the nock assembly 18 will be akin to that as previous described while structurally, the difference is that abutment of the socket section rear edge 58 with the forwardly facing lateral surface 72 of the ring member 70 results in the compression of the member.

With the foregoing in mind it will be appreciated that a bowfisherman may quickly and safely detach an arrow shaft having a speared fish thereon, without touching the arrowhead 14, merely by manipulating the twist lock mechanism of the present invention so that but one nock assembly plug section 34 to which the line 30 is tethered, is quickly attachable to another ready arrow shaft having its own arrowhead and the adaptor socket section 35. Thereafter, as time permits, the previously used shafts may be safely removed from any speared fish simply by pulling them forwardly from the fish. If time is not a critical factor, a single nock assembly according to the present invention may of course be reattached to the same arrow shaft as last retrieved, in the same manner.

As previously mentioned, the above described concept may additionally be utilized to provide for a removably attached arrowhead. As shown in FIG. 5, the arrowhead assembly 74 includes two separable components constructed similar to the above described plug and socket sections 34-35 of the nock assembly 18. The removable fish head section 76 comprises the socket component in this variation and the forward portion 24a thereof may be similar to that as shown in FIG. 1 and includes suitable barbs and a tip. This socket section includes the same elements as the socket section 35 of FIGS. 1-3 and cooperates with an adaptor or plug section 78 suitably affixed to the forward portion 16 of the arrow shaft. Thus, it will be seen that in this instance, the plug component 78 is carried by the arrow shaft and the attachment and removal of the arrowhead 76 is achieved in a manner similar to that as previously described.

It is to be understood that the present invention is not limited to the sole embodiment described above, but encompasses any and all embodiments within the scope of the following claims.

I claim:

1. An arrow comprising;
   an arrow shaft having opposite forward and rearward ends,
   a removable assembly at one said arrow shaft end and having a distal arrow element thereon,
   said removable assembly including cooperating plug and socket sections with one said section affixed to one said arrow shaft end and the other said section including said distal arrow element,
   said socket section having a bore terminating in an end wall,
   said plug section including an elongated plug element having a periphery insertable within said socket section bore and terminating in a forward tip,
   guide means radially extending from said plug element periphery,
   catch means in said socket section adapted to receive said guide means upon insertion of said plug element within said socket section bore, said catch means including lock means, and
   compressible resilient means carried by one said section,
   said compressible resilient means including a length of elastomeric tubing disposed within said socket section bore and having a central longitudinal axis extending transversely of the length of said arrow shaft, whereby following insertion of said plug element into said socket section bore and engagement of said guide means with said catch means, said resilient means is sandwiched between plug and socket sections to produce an axial biasing force between said sections maintaining said guide means within said lock means to securely connect said socket and plug assemblies relative one another and said arrow shaft.

2. An arrow according to claim 1 wherein, said distal arrow element comprises a bowfishing arrowhead tip.

3. An arrow according to claim 1 wherein, said distal arrow element comprises a nock element.

4. An arrow according to claim 1 wherein, said socket section bore and plug element periphery are substantially circular in cross-section.

5. An arrow according to claim 1 wherein, said guide means includes a pin substantially spaced from said plug forward tip.

6. An arrow according to claim 1 wherein, said catch means includes a plurality of slots communicating with one another.

7. An arrow according to claim 6 wherein, said slots include a longitudinal slot communicating with a transversely disposed slot, and a rearwardly directed lock slot communicating with said transversely disposed slot.

8. An arrow according to claim 1 wherein, said compressible resilient means is disposed within said socket section bore adjacent said bore end wall.

9. An arrow according to claim 1 including, tether attachment means on one said section adapted to receive a bowfishing line.

10. An arrow according to claim 1 wherein, said tubing comprises surgical tubing.

* * * * *